(12) United States Patent
Trovato et al.

(10) Patent No.: US 6,766,374 B2
(45) Date of Patent: *Jul. 20, 2004

(54) SYSTEM CREATING CHAT NETWORK BASED ON A TIME OF EACH CHAT ACCESS REQUEST

(75) Inventors: Karen I. Trovato, Putnam Valley, NY (US); Paul Rankin, Horley (GB); Carolyn Ramsey, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 154 days.

This patent is subject to a terminal disclaimer.

(21) Appl. No.: 10/154,672

(22) Filed: May 23, 2002

(65) Prior Publication Data

US 2002/0174234 A1 Nov. 21, 2002

Related U.S. Application Data

(63) Continuation of application No. 09/221,947, filed on Dec. 28, 1998, now Pat. No. 6,425,012.

(51) Int. Cl.[7] .............................................. G06F 15/16
(52) U.S. Cl. ........................ 709/227; 709/204; 709/207
(58) Field of Search ................................ 709/227, 204, 709/207, 206, 203, 228, 229, 226, 225, 238, 239; 725/110; 345/747; 705/10

(56) References Cited

U.S. PATENT DOCUMENTS

| | | | |
|---|---|---|---|
| 5,694,163 A | 12/1997 | Harrison | ..................... 725/110 |
| 5,764,916 A | 6/1998 | Busey et al. | ................. 709/227 |
| 5,828,839 A | 10/1998 | Moncreiff | .................... 709/204 |
| 5,848,396 A | 12/1998 | Gerace | ......................... 705/10 |
| 6,020,884 A | 2/2000 | MacNaughton et al. | .... 345/747 |
| 6,249,806 B1 | 6/2001 | Kohda et al. | ............... 709/206 |
| 6,425,012 B1 * | 7/2002 | Trovato et al. | ............. 709/227 |

OTHER PUBLICATIONS

J. Morphett et al., "eTV: A Mixed Reality interface onto Inhabited TV", IEEE Colloquium Virtual Reality: Personal, Mobile and Practical Applications, ref. No. 1998/545, pp. 1/1–1/5, London, UK, (Abstract).

G. Walker, "The Mirror Reflections on Inhibited TV", 1997 Fourth International Workshop on Community Networking Proceedings, Cat. No 97$^{th}$8337, pp. 149–156, New York, 1997, (Abstract).

\* cited by examiner

Primary Examiner—Le Hien Luu
(74) Attorney, Agent, or Firm—Gregory L. Thorne

(57) ABSTRACT

When a person requests access to a chat session, the time of the request is used to determine which chat room the person is placed. Other parameters are used to determine the surrounding factors, or context, within which the person initiated the request, such as the particular television program that the person was watching at the time of the request. By forming chat rooms based on the time of entry and the context in which the request is made, the chat rooms are likely to contain people with a common topic to discuss, such as the television news story being broadcast at that time. These time-of-entry chat rooms can also be structured to be of limited duration, obviating the overhead burden of deleting topic-specific chat rooms when the topic ceases to be of interest.

21 Claims, 3 Drawing Sheets

SYSTEM CREATING CHAT NETWORK BASED ON A TIME OF EACH CHAT ACCESS REQUEST

CROSS REFERENCE TO RELATED APPLICATIONS

This is a continuation of application Ser. No. 09/221,947, filed Dec. 28, 1998 now U.S. Pat No. 6,425,012.

BACKGROUND OF THE INVENTION

1. Field of the Invention

This invention relates to the field of communications, and in particular to interactive communications via a computer network.

2. Description of Related Art

Chat spaces are provided by computer network service providers to allow individuals to communicate with each other via the computer network. Typical chat spaces are arranged into one or more chat rooms, where a number of people may meet. Each person has an identifying name or alias, and in some chat spaces, an identifying graphic item in a graphical 2-D or 3-D representation of the chat space. Each person decides which chat room to enter or leave, and who to talk to. People decide what to discuss by the stated topic of the room, or randomly with little or no direction.

Because of the free form nature of chat rooms and chat spaces, they are well suited for engaging in random conversations. To discuss a particular topic of interest, the conventional means of establishing communications is to navigate to a topic-specific chat room in which that particular topic is routinely discussed. Often times, however, the topic is of passing interest, and a topic-specific chat room for that topic does not exist. Typically, a person who wants to discuss a particular topic of interest will navigate to a chat space having topic-specific chat rooms on related topics, and try to find other people who may be interested in discussing the desired topic of interest. As in any random social gathering, however, rarely do people show up in such chat spaces with the desire to discuss the same topic, and the conversation meanders about a variety of topics until the desired topic is forgotten, or a sufficient interest in the desired topic is generated amongst the other random arrivers to the chat space or room.

A service provider could provide a myriad assortment of topic-specific chat rooms in the hope of allowing a user to find a room in which other people with similar interests will congregate, but such an approach may be infeasible. An index of each chat room and an effective means of finding the chat room that best suits the particular topic that one wants to discuss must be developed and maintained. Although some topics may be timeless, most topics of discussion are temporal, and means must also be developed to continually remove dated topic rooms and add current topic rooms.

Therefore, a need exists for a means of dynamically forming chat rooms that have a high likelihood of containing people desiring to discuss the same topic, yet not requiring the maintenance and overhead associated with topic-specific chat rooms.

BRIEF SUMMARY OF THE INVENTION

This invention is premised on the observation that an event can affect a number of people at the same time, and some of these people may have a desire to discuss that event at that time. For example, when a television news story is broadcast, thousands of people will receive the news at the same time, and it is likely that in at least some households, a discussion will ensue relating to the topic of the news story. Similarly, when a particular play or call is made at a sporting event, the discussions which immediately follow are typically directed to that play or call. That is, the fact that a number of people experience the same event at the same time increases the likelihood that many people would be interested in discussing that same event at that time.

In accordance with this invention, the time that a person initiates a chat session is used as a parameter to determine which chat room the person is placed. Other parameters may also be used, such as the particular television station that the person is watching at that time, the person's locale, as well as a set of predefined personal interest factors, or profile, associated with the person. For example, the chat server may place the first dozen people who initiate a chat session at 8:02 p.m. on Monday while viewing a given television station, and have expressed an interest in sports, in one chat room, based on the likelihood that these people want to discuss the Monday night football game.

By forming chat rooms based on the time of entry and other relevant factors, the chat rooms are likely to be topic-specific, without incurring the overhead typically associated with the establishment and maintenance of topic-specific chat rooms. Also, these time-of-entry chat rooms can be structured to be of limited duration, obviating the overhead burden of deleting a topic-specific chat room when the topic generates only waning interest.

DETAILED DESCRIPTION OF THE INVENTION

Figure 1:
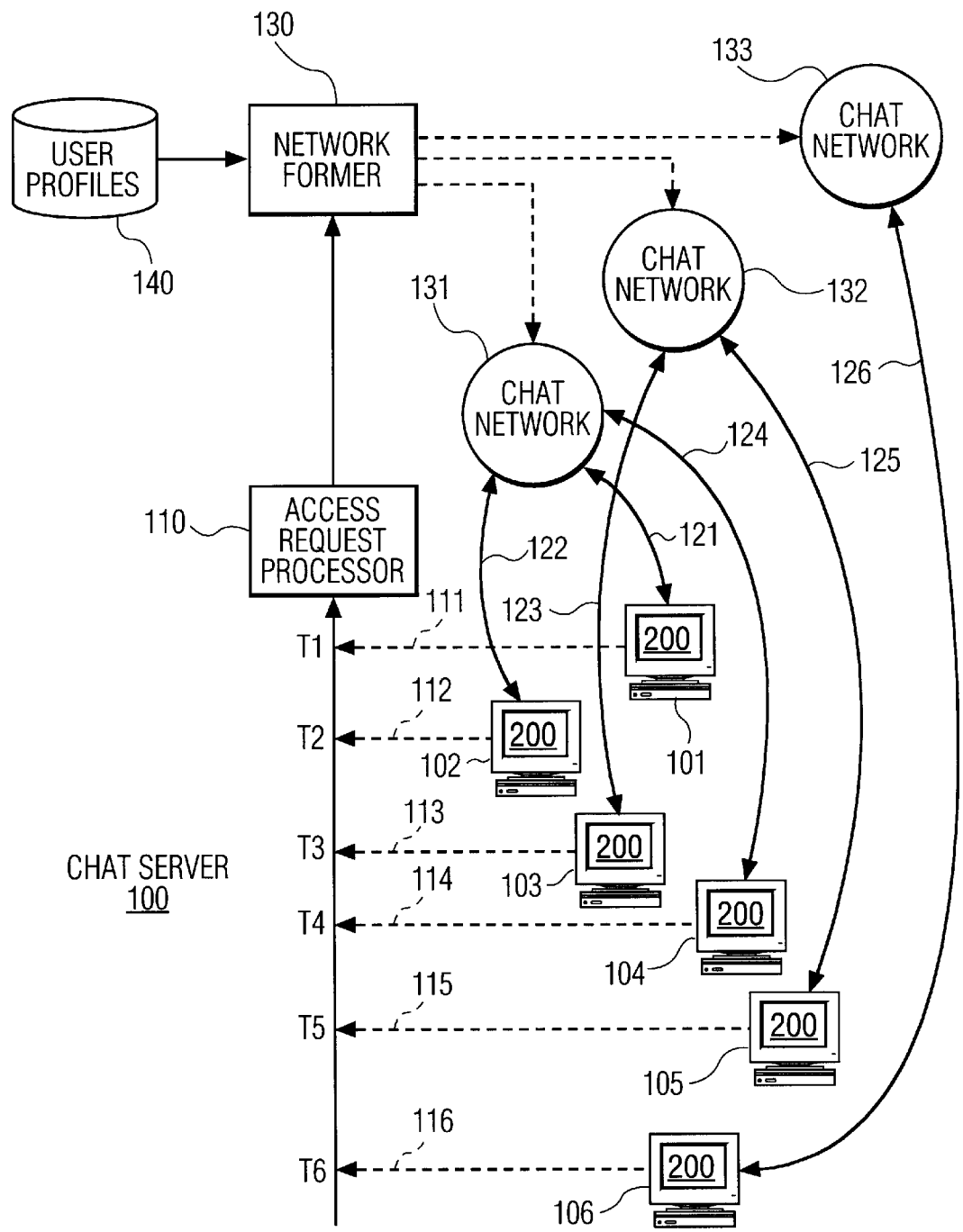
FIG. 1 illustrates an example block diagram of a chat server in accordance with this invention.

FIG. 1 illustrates an example block diagram of a chat server 100 in accordance with this invention. The chat server 100 may be a dedicated processing system, or a capability offered by a general purpose service provider, such as an Internet service provider. The chat server 100 includes an access request processor 110 that receives access requests from user communication devices 200, and a network former 130 that forms individual chat networks in response to the access requests. For clarity, the term chat network is used herein to define the communications path associated with a chat room. Each user allocated to a chat room communicates with other users in the chat room via the chat network associated with the chat room. The formation of a chat network corresponds to the symbolic terminology of placing people in a chat room. The effect of symbolically placing a person into a chat room is the addition of a user's communication device 200 to a chat network 131–133 that is associated with the symbolic chat room.

FIG. 1 illustrates six user communication devices 101–106 that submit access requests 111–116 to the access request processor 110 at times T1–T6, respectively. User communication device 101 submits an access request 111 at time T1, and another user communication device 102 submits an access request 112 at time T2, and so on. As illustrated in FIG. 1, in response to the requests 111–116, the network former 130 creates chat networks 131–133. When a user in a chat network sends a message, it is broadcast to each of the other users in that network. User 101, for example, sends a message to the chat network 131, via interconnection 121; the chat network 131 sends this message to user 102, via 122, and to user 104, via 124. The messages may be text, audio, audio-visual, multi-media, or any other format suitable for transmission. The formation of the chat networks 131–133 is dependent upon the times of access T1–T6, both directly and indirectly. The direct dependency is based upon the time of access itself, the indirect dependency is based upon other parameters or events at the time of access.

Table 1 illustrates an example of parameters and events used to form chat networks based on the time of each user access request. User 101, for example, requests an access at 8:02pm. At the time user 101 requested the access, his television was tuned to NBC, his radio was tuned to WABC, and he was in New York. Also illustrated in table 1, user 101 generally prefers news and doesn't prefer sport; his mood is generally light, and he prefers to lead discussions. Although most preferences and characteristics are generally time insensitive, some characteristics may be time dependent. For example, at other times or in other contexts, user 101 may be in a serious mood, or prefer to take a less active role in discussions. Similarly, the user's character may differ depending upon whether he is requesting access during business hours or during leisure hours. The aforementioned parameters, characteristics, preferences, events, and the like are characterized hereinafter as context profiles and user profiles. The context profile reflects the context within which a user is formulating the access request. That is, the context profile includes the television station the user was tuned to when the request was made, the location of the user, the user's current activities or objectives, and other factors which may be relevant to the determination of the user's desired topic of discussion. The user profile includes the preferences of the user and other factors, such as age, gender, and education level, which may be relevant to the determination of the user's similarity or compatibility to other users.

TABLE 1

| User | Time | TV | Radio | Location | News | Sports | Mood | Role |
|---|---|---|---|---|---|---|---|---|
| 101 | 8:02 pm | NBC | WABC | NY | Yes | No | Light | Leader |
| 102 | 8:03 pm | NBC | — | CT | Yes | No | — | — |
| 103 | 8:05 pm | NBC | — | CA | No | Yes | Serious | Leader |
| 104 | 8:06 pm | — | — | — | Yes | — | Jocular | Listener |
| 105 | 8:10 pm | ABC | | CA | No | Yes | — | Listener |
| 106 | 8:20 pm | NBC | WABC | NY | Yes | No | Light | Listener |

As illustrated in FIG. 1, the chat server 100 in a preferred embodiment includes a memory 140 that stores the user profile for some or all of the users, obviating the need to include a user profile with each request for access. In a preferred embodiment, only temporal changes to the stored user profile are included in the request for access 111–116. Other embodiments would be evident to one of ordinary skill in the art. For example, the user profile may be stored locally at the user site, and transmitted on demand to the chat server 100. The user profile may be automatically or semi-automatically generated, based for example on the user's television viewing habits.

In accordance with this invention, the network former 130 uses the time of access T1–T6 as a primary factor for forming each chat network. Upon receipt of the access request and associated context and user profiles from users 101 and 102, the network former 130 forms the chat network 131 containing users 101 and 102 because they each requested access at approximately the same time while watching the same television station, and had similar or compatible user profiles. User 103 also requested access at approximately the same time while watching the same television station, but had sufficiently differing characteristics from users 101 and 102 to warrant a formation of another chat network 132. As would be evident to one of ordinary skill in the art, the degree of selection beyond time of access will be dependent upon the expected number of users. If only a few users are expected, the users that request access during a longer time period are placed in the same chat network. If many users arrive, or are expected to arrive, multiple chat networks can be formed during the same time period, and the users that request access during the same period are selectively placed in the chat networks having users with similar or compatible characteristics.

At time T4, when user 104 requests access, two chat networks 131, 132 are available. Based on user 104's characteristics, which are common to those of users 101 and 102, the network former 130 reforms chat network 131 to include user 104. Similarly, at time T5, user 105 is added to the chat network 132, based on a similarity of characteristics with user 103. At time T6, when user 106 requests access, the network former 130 creates a new chat network 133, because the time of the requested access (8:20pm) is deemed too remote from the times of creation of networks 131 and 132. That is, even though user 106's profile is identical to user 101, user 106 is not placed in user 101's chat network 131, because it is somewhat less likely that whatever event prompted user 101 to initiate a chat request at 8:02pm was the same event that prompted user 106 to initiate a chat request 18 minutes later. In this example, it is assumed that another user will initiate a chat request and will be placed into the new chat network 133. The determination of the time span for access to each chat network may also be a function of the expected number of users. If few users are expected, the span of access times to a chat network will likely be large, to provide sufficient time for a number of users to join. For example, if Table 1 reflected a true rate of occurrences of chat access requests, all six users would likely be placed in a single chat network having a wide span of allowable access times, rather than forming chat networks containing fewer than three users. On the other hand, if dozens of users request access each minute, each chat network can be limited to users who request access within a few seconds of each other.

As discussed above, the network former 130 creates chat networks based on a number of rules or guidelines. The goal of the network former 130 is to partition the users into smaller subsets of users, and allocate each subset to a chat network. Preferably, the subsets will contain users having a common topic of discussion. To increase the likelihood of livelier or more interesting conversation, the subsets will contain users having differing points of view. That is, for example, users having an interest in politics may be categorized as being liberal, conservative, or moderate. The users having an interest in sports may be given the option of specifying "home team fan" or "visitor fan" during the chat room formation process. The preferred subsets will contain users having similar fields of interest but differing views within those fields of interest. Other rules and guidelines can be developed based upon, for example, trial runs and user feedback. That is, one might use the age of the users as a parameter for forming chat rooms, and based on user feedback regarding the quality or entertainment value of the chat session, determine whether it is preferable to form chat rooms of similar or differing age groups.

The network former 130 also performs the administrative tasks of creating and terminating each chat network. The number of simultaneous chat networks and the duration of allowable access to each chat network, as stated above, will be determined by the number of users, or expected number of users, requesting access during a given time period. These parameters are best determined by experience and user feedback. In general, however, the duration of allowable access to each chat network should be limited to less than an hour. Also, the number of users allowed to access each chat network should also be limited to under twenty, so that efficient and effective communication may occur. The duration of access and the number of users allowed to access may also be limited based upon the genre of the discussion; for example, discussions on a news topic may best be effected by limiting the number of users in the chat network to less than ten, and the duration of allowable access to less than a minute. Conversely, discussions on a current football game may allow dozens of users, and allow access at any time during the game. In accordance with this invention, the network former 130 terminates the access to a chat network whenever the time of requested access is beyond an allowable duration of access since the time the chat network was created, and whenever the number of users reaches a maximum allowable number of users in each chat network. In extended access duration sessions, such as the aforementioned football game, the network former 130 may reopen access as users leave the chat session, as well. The network former 130 creates a new chat network whenever the access to all existing chat networks are terminated, or whenever the number of users having differing interests supports the creation of multiple chat networks during the same time period. As would be evident to one or ordinary skill in the art, the network former 130 may also be used to regulate the load on communications servers by forming networks based also upon other factors, such as available bandwidth.

In a preferred embodiment of this invention, the network former 130 also terminates each chat network in accordance with given rules and guidelines. In general, each chat network will be terminated after a given period of time of no activity among the users. To prevent premature terminations, however, some contexts such as sports may include a minimum duration parameter, or a parameter based on the television program being viewed by the users. That is, the chat network may be scheduled to be closed one hour after the end of the television program, or after one hour of inactivity, whichever is later. After termination, the network former 130 reallocates the resources used by the terminated chat networks to newly formed chat networks. This reallocation may also be applied based on each user network connection. For example, when a user expressly leaves a chat network, the network former 130 may reallocate the resources used to connect that user to the chat network. In like manner, the network former 130 may subsequently combine chat networks as users leave each of the chat networks. For example, in an extended duration chat network, such as those formed during sports events, the network former 130 may join two existing chat networks when they have similar contexts and when the number of users in each network is below a particular minimum, typically 3 or 4.

Figure 2:
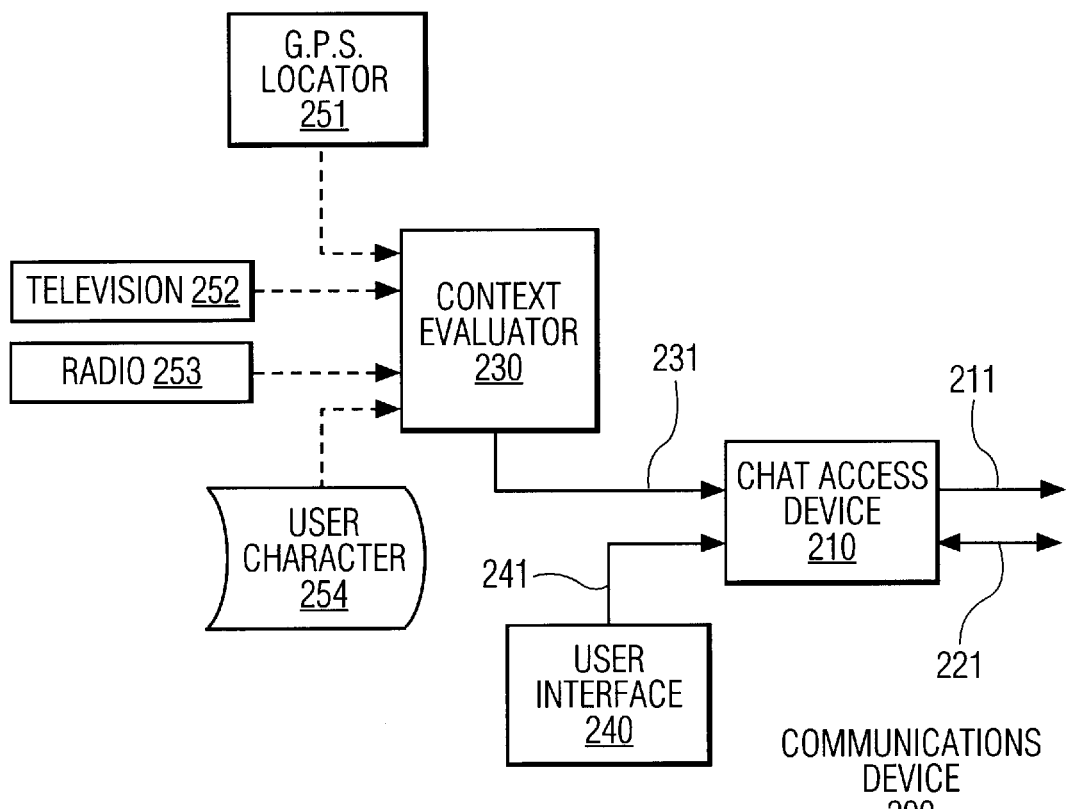
FIG. 2 illustrates an example block diagram of a user communications device in accordance with this invention.

FIG. 2 illustrates an example block diagram of a user communications device 200 in accordance with this invention. The example user communications device 200 includes a chat access device 210, a context evaluator 230, and a user interface 240. The user (not shown) uses the user interface 240 to initiate a request 241 to the chat access device 210 for an access request 211. The context evaluator 230 monitors the environment of the user to determine a context profile 231 that is associated with the access request 211. The chat access device 210 also creates the ancillary data needed to establish an access to a chat server, such as providing a user identification, a chat space name or alias, and other administrative details, and provides the communications means for communications with the accessed chat network, via communications link 221. The chat access device 210 may also control the termination of communications, based for example on a change of context 231, or a specified period of inactivity. That is, for example, the chat access device 210 may be structured to terminate communications whenever the user changes the channel on a television 252. In a preferred embodiment, the chat access device 210 is a computer, but it can be as simple as a telephone. The computer may be a general purpose computer such as a desktop, a laptop, a palmtop, and the like, or it may be a special purpose computer as might be contained in a web-access device attached or contained in a television.

As illustrated in FIG. 2, a number of devices 251–254 may provide input to the context evaluator 230. The context evaluator 230 may be connected to a television 252 or radio 253 so as to determine a monitor parameter that identifies the media that the user was monitoring when the request for access 211 was initiated. A GPS (Global Positioning System) locator may be used to provide a locale parameter that identifies where the user was when the request for access 211 was initiated. A source of user character data 254 may be used to provide parameters related to the user's character or other parameters, such as locale and media, at the time the request for access 211 was initiated. In general, the context evaluator 230 and ancillary devices 251–254 are optional, in that the context profile 231 is used to refine the formation of chat networks of users having compatible interest. If no context or user profiles are provided, the network former 130 will form chat networks based solely on the time of access request. For example, in the scenario discussed for Table 1 and FIG. 1, user 104 provides no context information, and can be assigned to either chat network 131 or 132, based solely on the time of the access request.

The user interface 240 may be integral with an ancillary device, such as the television 252. For example, the chat room may appear as a picture-in-picture image on the television 252, or the television broadcast may appear as a picture-in-picture image in a display of the chat room. The television images may be a recording of the broadcast that occurred when the chat room was formed, for example the news segment that stimulated the formation of the chat session, or it may be a continuation of the current broadcast, for example the continuing broadcast of a football game. If the chat room is audio, rather than visual, the interface 240 may be a speaker phone, for example in a network that is formed as a telephone party line.

Figure 3:
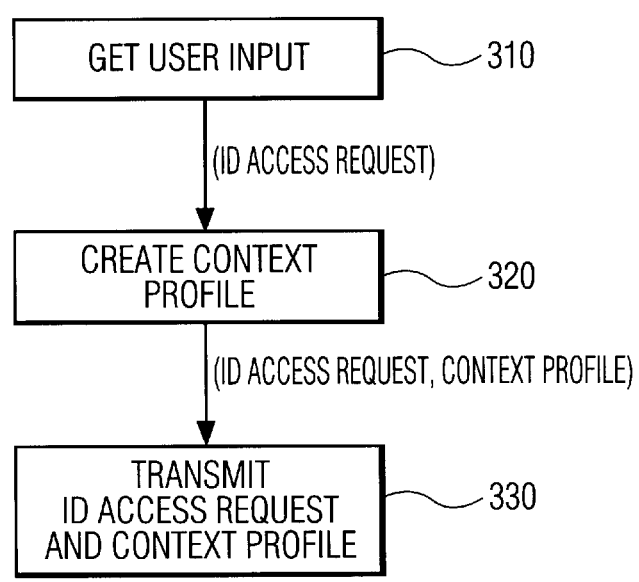
FIG. 3 illustrates an example flow diagram for requesting chat access in accordance with this invention.

FIG. 3 illustrates an example flow diagram for requesting chat access in accordance with this invention, as might be implemented in a communications device 200. At 310, the user input is received, from which an access request containing the user's identification is formulated. At 320, the context within which the access request was generated is determined, and a context profile is appended to the access request containing the user's identification. At 330, the access request, including the user's identification and context profile is transmitted to the chat server 100. The creation of the context profile may be automated, as shown by the dotted lines to the context evaluator 230 in FIG. 2, or it may be a manual process wherein the user enters context information in response to queries from the chat access device 210 or the access request processor 110.

Figure 4:
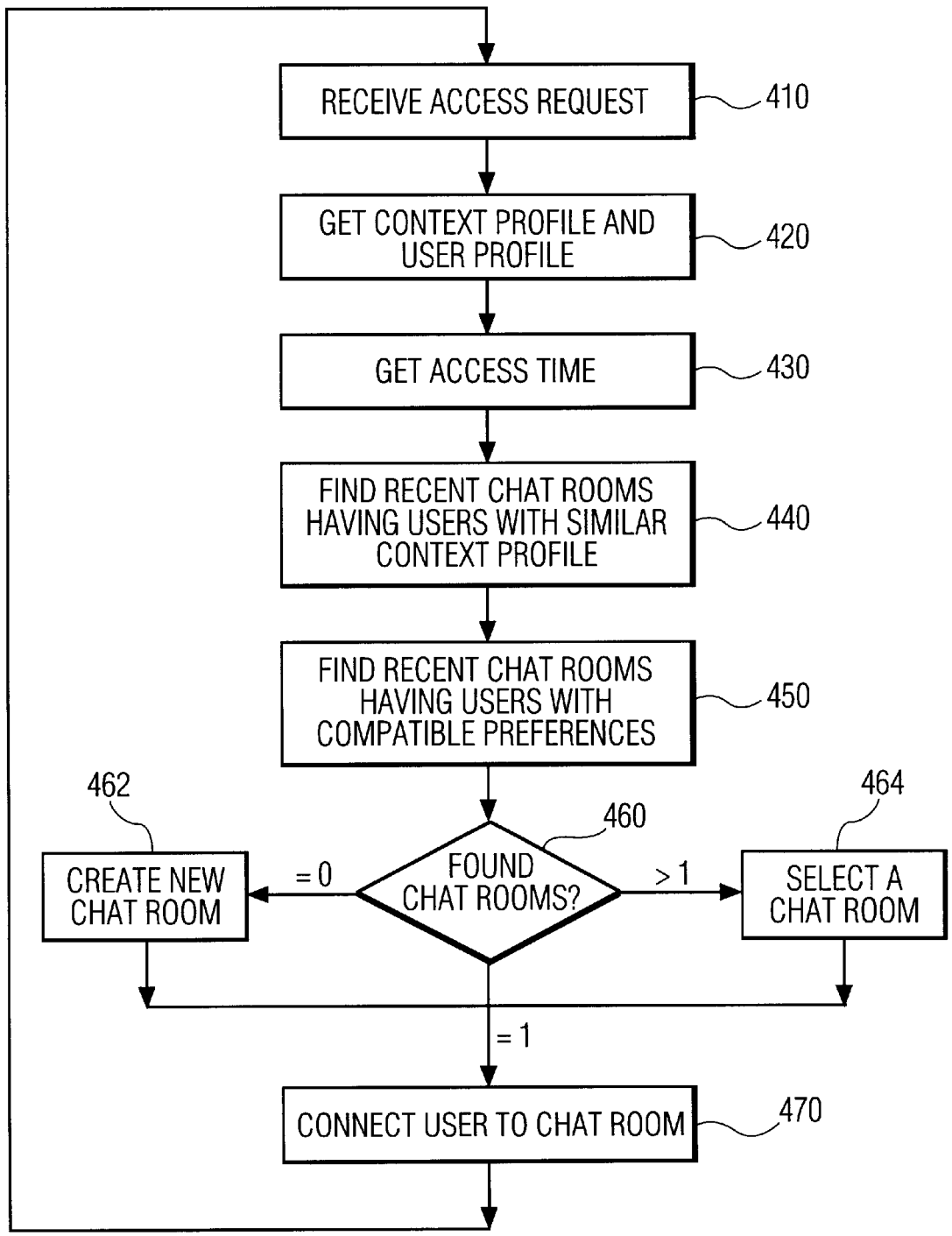
FIG. 4 illustrates an example flow diagram for allocating users to chat rooms in accordance with this invention.

FIG. 4 illustrates an example flow diagram for allocating users to chat rooms in accordance with this invention, for example, in a chat server 100. As noted above, allocating users to a chat room is the metaphor used to define the formation of a chat network of user communication devices. At 410, the access request is received. At 420, the context profile and user profile is determined. Corresponding to FIG. 1, the user profile will typically be determined by providing an identification of the user, which would be contained in the access request, to the storage of user profiles 140 at the chat server 100. Temporal changes to the stored user profile are contained in the access request. An access time is associated with each access request, at 430. At 440, "recent" chat rooms are found that contain users with "similar" context profiles. As discussed previously, access to chat rooms in accordance with this invention is limited to particular access span times. Recent chat rooms are those chat rooms that are open to access at the time that the access request is received. Similarly, as discussed previously, the degree of segregation used to determine whether context profiles are similar is a function of the number of users expected to request access. If very few users are expected, all context profiles may be deemed similar to all other context profiles, whereas if many users are expected, at least one parameter of the context profile must be common to those of the other users for the context profile to be deemed similar. At 450, the recent chat rooms that have users with compatible user profiles are found, using the aforementioned definitions of recent and compatible. That is, the definition of compatible may include some purposeful diversity among the users, to foster interesting or challenging conversation. The subsequent actions depend 460 upon whether any recent chat rooms having similar profiles had been found. If no recent chat rooms having similar profiles are found, a new chat room, or chat network, is formed, at 462, and the user is added to that new chat room at 470. If only one recent chat room is found having users with similar profiles, the user is added to that one chat room at 470. If multiple chat rooms having users with similar profiles are found, one of these chat rooms is selected, at 464, and the user is added to that one chat room, at 470. The selection among recent chat rooms can be based on any criteria, including a random draw. In a preferred embodiment, the order of preference for selection is: recent chat rooms having users with similar context profiles and compatible user profiles, followed by recent chat rooms having users with similar context profiles only, followed by recent chat rooms having users with compatible user profiles only.

The foregoing merely illustrates the principles of the invention. It will thus be appreciated that those skilled in the art will be able to devise various arrangements which, although not explicitly described or shown herein, embody the principles of the invention and are thus within its spirit and scope. For example, when multiple recent chat rooms are found, the user may be provided the option of selecting one, based upon a list of users in each chat room, or samples of recent messages in each chat room. Also, although the access time has been presented herein as an absolute time measure, the access time could be a relative measure. For example, each chat network could have an associated count-down clock that starts counting down when the chat network is first created; when count-down clock counts down to zero, further access to the chat network is terminated. In this manner, the access time of a user's request is defined in terms of each chat network's lifetime, rather than in terms of a wall clock. Similarly, the allowable span of access time may be dynamically adjusted by defining it in terms of the volume of user access requests. These and other techniques of determining time coincidence are common to one of ordinary skill in the art.

What is claimed is:

1. A method for forming a chat network, comprising the acts of:

receiving a plurality of access requests from a corresponding plurality of users, assigning an access time parameter to each access request based on a time of each said access request, establishing at least a first communication path among a first subset of the plurality of users based upon said access time parameter assigned to each said access request, and establishing a second communication path among a second subset of the plurality of users if a total number of said plurality of users exceeds a dynamically established threshold.

2. The method of claim 1, wherein said dynamically established threshold is determined based on an available bandwidth of said first communication path.

3. The method of claim 1, wherein said dynamically established threshold is determined based on a number of users expected in said plurality of users.

4. The method of claim 1, wherein each said access request includes a context profile and wherein the act of establishing at least one of said first communication path and said second communication path is further based upon said context profile associated with each said access request.

5. The method of claim 4, wherein said dynamically established threshold is determined based on said context profile.

6. The method of claim 4, wherein said context profile includes at least one of a locale parameter, a monitor parameter, and at least one character parameter.

7. The method of claim 6, wherein said monitor parameter includes an identification of a broadcast program associated with each said access request.

8. The method of claim 1, comprising the act of combining said first communication path and said second communication path into a single communication path if a number of users in said first subset of users drops below a predetermined number.

9. The method of claim 1, further comprising the act of accessing a plurality of user profiles, each of said plurality of user profiles being associated with a corresponding one of said plurality of users, and wherein the act of establishing said first communication path is based upon said plurality of user profiles.

10. The method of claim 9, wherein each said user profile includes at least one of an age parameter, a gender parameter, an education parameter, a locale parameter, and an interest parameter.

11. The method of claim 9, wherein the act of establishing said first communication path is based upon a disparity in at least a plurality of said user profiles of said first subset of users.

12. The method of claim 9, wherein the act of establishing said first communication path is based upon a similarity in at least a plurality of said user profiles of said first subset of users.

13. The method of claim 9, wherein at least one of said plurality of users profiles comprises a portion of a corresponding access request.

14. The method of claim 9, wherein at least one of said plurality of user profiles is accessed locally.

15. The method of claim 1, further comprising the act of terminating said first communication path among said first subset of said plurality of users based on at least one of a level of activity on said first communication path, a predetermined time period, and a context dependent time period.

16. The method of claim 1, further comprising the act of establishing a third communication path among a third subset of said plurality of users based upon said first subset, said second subset, and a level of activity on at least one of said first communication path and said second communication path.

17. The method of claim 1, comprising the act of providing each of said plurality of user with an option to select to be in one of said first subset of users and said second subset of users if the total number of said plurality of users exceeds said dynamically established threshold.

18. The method of claim 1, comprising providing to each of said first subset of users a signal to establish a representation of said first communication path.

19. The method of claim 18, wherein said signal establishes a visual representation of said first communication path.

20. The method of claim 18, wherein said signal establishes a picture-in-picture (PIP) representation of said first communication path.

21. The method of claim 18, wherein said signal establishes at least a text representation of said first communication path.

\* \* \* \* \*